(12) United States Patent
Farkas et al.

(10) Patent No.: US 8,958,344 B2
(45) Date of Patent: Feb. 17, 2015

(54) METHOD AND SYSTEM OF ENHANCING MULTIPLE MAC REGISTRATION PROTOCOL (MMRP) FOR PROTOCOL INTERNETWORKING

(71) Applicant: Telefonaktiebolaget L M Ericsson (Publ), Stockholm (SE)

(72) Inventors: János Farkas, Kecskemét (HU); David Ian Allan, San Jose, CA (US); Panagiotis Saltsidis, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 177 days.

(21) Appl. No.: 13/772,240

(22) Filed: Feb. 20, 2013

(65) Prior Publication Data

US 2014/0233429 A1 Aug. 21, 2014

(51) Int. Cl.
*H04L 12/28* (2006.01)

(52) U.S. Cl.
USPC .................................................. 370/255

(58) Field of Classification Search
CPC ................ H04L 45/02; H04L 41/12
USPC ........................................... 370/255
See application file for complete search history.

(56) References Cited

U.S. PATENT DOCUMENTS

| | | | |
|---|---|---|---|
| 2006/0268749 | A1 | 11/2006 | Rahman et al. |
| 2008/0013534 | A1 | 1/2008 | Tsuzuki et al. |
| 2011/0228774 | A1* | 9/2011 | Saltsidis et al. ............... 370/390 |

FOREIGN PATENT DOCUMENTS

| | | |
|---|---|---|
| EP | 1617605 A1 | 1/2006 |
| WO | WO-2007142719 A2 | 12/2007 |

OTHER PUBLICATIONS

"Media Access Control (MAC) Bridges and Virtual Bridged Local Area Networks", Amendment 20: Shortest Path Bridging, IEEE Standard for Local and metropolitan area networks, Jun. 29, 2012, 340 pages, IEEE Computer Society, IEEE Std 802.1 aq, New York, NY.
David Ian Allan, "Methods and Devices for Implementing Shortest Path Bridging MAC Mode Support Over a Virtual Private Lan Service Network", 40 pages, U.S. Appl. No. 13/746,199, filed Jan. 21, 2013.

(Continued)

*Primary Examiner* — Ronald Abelson
(74) *Attorney, Agent, or Firm* — Blakely Sokoloff Taylor & Zafman LLP

(57) ABSTRACT

A method is disclosed to forward Ethernet frames associated with a service instance at a node (a "forwarding node") in a network supporting an implementation of a protocol for creating logical loop-free topologies. The method starts with receiving a number of MMRPDUs at the forwarding node from links in the first network (receiving links), where each MMRPDU of the first plurality of MMRPDUs contains a first interested node list including one or more interested nodes identified by MAC addresses. Then a service instance identifier (SID) is identified for the service instance and a first set of MAC addresses interested in the service instance is formed. Then a number of MMRPDUs are sent to links associated with the service instance, where each MMRPDU contains a second set of MAC addresses interested in the service instance. The sending may be accompanied by the node installing filtering at the forwarding node accordingly.

30 Claims, 10 Drawing Sheets

(56) References Cited

OTHER PUBLICATIONS

"IEEE Standard for Local and metropolitan area networks—Media Access Control (MAC) Bridges and Virtual Bridge Local Area Networks", IEEE Computer Society, IEEE Std 802.1Q, Aug. 31, 2011, 1365 pages, New York, USA.

"Virtual Bridged Local Area Networks Amendment 7: Multiple Registration Protocol", IEEE Standard for Local and metropolitan area networks, IEEE Computer Society, IEEE Std 802.1ak, Jun. 22, 2007, 107 pages, New York, USA.

D. Fedyk, et al., "IS-IS Extensions Supporting IEEE 802.1 aq Shortest Path Bridging", Internet Engineering Task Force (IETF), RFC 6329, Standards Track, ISSN 2070-1721, Apr. 2012, 38 pages.

David Ian Allan, "802.1AQ Support Over IETF EVPN", U.S. Appl. No. 13/594,076, filed Aug. 24, 2012, 39 pages.

David Ian Allan, "802.1AQ Support Over IETF EVPN", U.S. Appl. No. 61/645,431, filed May 10, 2012, 34 pages.

* cited by examiner

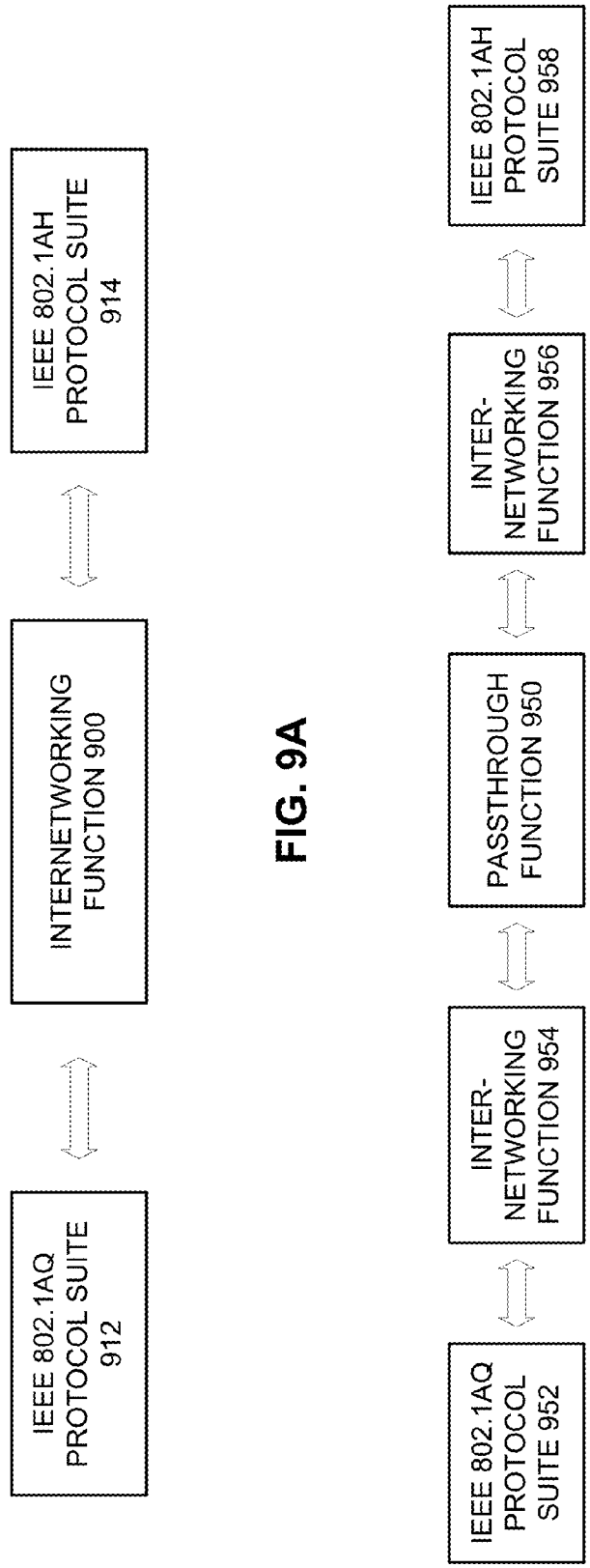

METHOD AND SYSTEM OF ENHANCING MULTIPLE MAC REGISTRATION PROTOCOL (MMRP) FOR PROTOCOL INTERNETWORKING

FIELD

The embodiments of the invention are related to the field of frame forwarding in an Ethernet network. More specifically, the embodiments of the invention relate to a method and system for enhancing multiple media access control (MAC) registration protocol (MMRP) for protocol internetworking.

BACKGROUND

Today Ethernet is the dominant computer networking technology for local area networks (LANs). As Ethernet gains wide popularity among enterprise, carriers, and cloud service providers, Ethernet architecture has transitioned LAN segments from being implemented as passive shared mediums only to being implemented as actively switched networks. Over the years, numerous protocols have been implemented in actively switched networks for Ethernet frame forwarding. For example, a variety of spanning tree protocols utilizes flood-and-learn schemes, where frame forwarding is carried out largely in a data plane. Later shortest path bridging (SPB) protocol adopts a different approach, where a node in a SPB network contains link states of the network thus frames can be forwarded along a shortest path without resorting to flood-and-learn. As Ethernet is used in more networks, more applications need forward frames across networks supporting different frame forwarding protocols, and internetworking for frame forwarding is a challenge.

Multiple media access control (MAC) registration protocol (MMRP) is an application of multiple registration protocol (MRP), which replaced generic attribute registration protocol (GARP). MMRP operates at the Data Link Layer at the Open Systems Internnection (OSI) model and it registers MAC addresses on network devices in an Ethernet network. MMRP is originally defined in IEEE 802.1ak-2007 and subsequently included in 802.1Q-2011. It replaced the 802.1D based GARP multicast registration protocol (GMRP). MMRP collects information nodes interested in reception of frames destined to a particular MAC address (e.g., a group MAC address), and frames destined to the particular MAC address within an MMRP compatible network will then be forwarded to all the interested nodes within the network.

As Ethernet grows to become ubiquitous, a frame may go across networks supporting different frame forwarding protocols. An MMRP compatible network needs to be able to forward frames destined to and accept frames sourced from a network that does not support MMRP natively. In other words, MMRP registration information regarding an application needs to be shared with a non-MMRP network.

SUMMARY

A method is disclosed to forward Ethernet frames associated with a service instance at a node (a "forwarding node") in a network supporting an implementation of a protocol for creating logical loop-free topologies. The service instance identifies a service through the first network, where Ethernet frames are forwarded in links associated with the service instance within the first network. Media access control (MAC) address registration with the first network complies with an implementation of multiple MAC registration protocol (MMRP), thus nodes of the first network with MAC address interests issue MMRP protocol data units (PDUs), multiple MAC registration PDUs (MMRPDUs). The method starts with receiving a number of MMRPDUs at the forwarding node from links in the first network (receiving links), where each MMRPDU of the first plurality of MMRPDUs contains a first interested node list including one or more interested nodes identified by MAC addresses. Then a service instance identifier (SID) is identified for the service instance by extracting information from the header of each frame encapsulating an MMRPDU (encapsulating frame) and each MMRPDU itself. Then a first set of MAC addresses interested in the service instance is formed, where the first set of MAC addresses is associated with the forward node and the SID. The method then sends a number of MMRPDUs to links associated with the service instance (transmitting links), where each MMRPDU of the second plurality of MMRPDUs to a transmitting link contains a second set of MAC addresses, the second set of MAC addresses includes MAC addresses interested in the service instance not received from the transmitting link. The sending may be accompanied by the forwarding node installing filtering such that an Ethernet frame is forwarded at the receiving node to its destination if the Ethernet frame is destined to one or more interested nodes identified by the first set of MAC addresses.

When the forwarding node is at a boundary of the network, where it interconnects with a second network not deploying MMRP, the method may continue with extracting the interested nodes from the first set of MAC addresses and the SID associated with the first set of MAC addresses, and then saving the extracted interested nodes and the SID into a control plane database for frame forwarding at the second network based on a protocol compatibility determination at the second network.

A network device serving as a node in a first network supporting an implementation of an enhanced MMRP is disclosed. The network device is configured to forward Ethernet frames associated with a service instance, where the service instance identifies a service through the first network and Ethernet frames are forwarded in links associated with the service instance within the first network. Media access control (MAC) address registration with the first network complies with an implementation of multiple MAC registration protocol (MMRP), and nodes of the first network with MAC address interests issue MMRP protocol data units (PDUs), multiple MAC registration PDUs (MMRPDUs), that follow the service instance within the first network. The network device contains a frame interface module configured to receive a number of MMRPDUs from links in the first network (receiving links), where each MMRPDU of the number of MMRPDUs contains a first interested node list including one or more interested nodes identified by MAC addresses. The network device also includes a service instance identifier (SID) and frame processor configured to identify a SID for the service instance by extracting information from at least one of: each frame encapsulating an MMRPDU (encapsulating frame), and each MMRPDU itself. The extracted information is stored in a node list database of the network device. The network device also contains an MMRPDU framing module configured to generate a number of MMRPDUs, where the number of MMRPDUs are encapsulated in a set of Ethernet frames. The set of Ethernet frames are sent through the frame interface module to links associated with the service instance (transmitting links). The set of Ethernet frames contains a set of MAC addresses, and the set of MAC addresses includes MAC addresses interested in the service instance not received from the transmitting link. Note the frame interface module is further configured to install filtering at the node such that an Ethernet frame is forwarded to its destination if the Ethernet frame is destined to one or more interested nodes identified by the first set of MAC addresses.

When the network device is at a boundary between two networks, and where it interconnects with a second network not deploying MMRP, the network device may contain an internetworking module configured to extract the interested nodes from the first set of MAC addresses and the SID associated with the first set of MAC addresses. The network device may further contain an internetworking database configured to save the extracted information about interested nodes and the SID for frame forwarding at the second network based on a protocol compatibility determination at the second network.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIGS. 9A-B are block diagrams illustrating internetworking functions with some standard protocol suites according to embodiments of the invention.

DETAILED DESCRIPTION

Figure 1A:
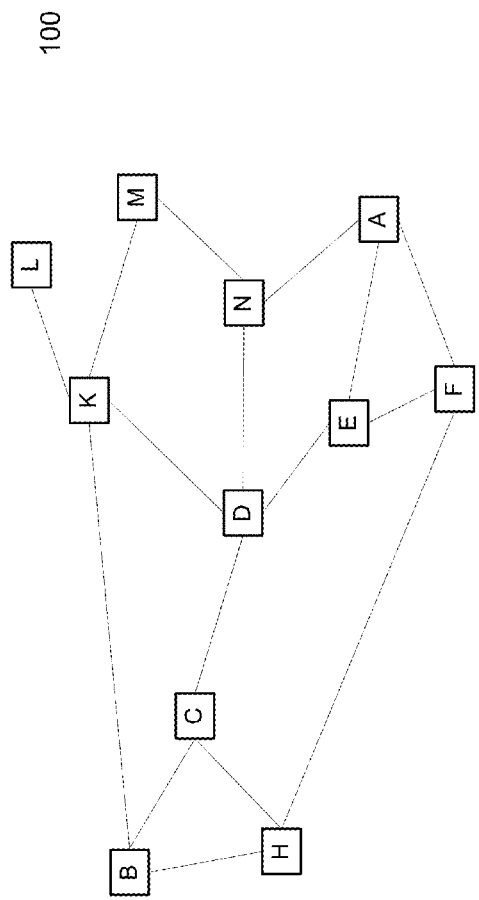
FIG. 1A is a block diagram illustrating one embodiment of a network configuration supporting multiple media access control (MAC) registration protocol (MMRP).

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram will be described with reference to the exemplary embodiment of FIG. 10. However, it should be understood that the operations of flow diagrams can be performed by embodiments of the invention other than those discussed with reference to FIGS. 3 and 7, and the embodiments discussed with reference to FIG. 10 can perform operations different than those discussed with reference to the flow diagrams of FIGS. 3 and 7.

As used herein, a network device (e.g., a router, switch, and bridge) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper OSI layer identifiers.

Network devices are commonly separated into a control plane and a data plane (sometimes referred to as a forwarding plane or a media plane). In the case that the network device is a switch/bridge (or is implementing bridge functionality), the control plane typically determines how a frame (e.g., Ethernet frame) is to be forwarded (e.g., the next hop for the frame and the outgoing port for that frame), and the data plane is in charge of forwarding that frame. For example, the control plane typically includes one or more forwarding/routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network devices to exchange paths and select those paths based on one or more metrics. Note that embodiments of this invention also apply where the control plane and data plane are in separate network devices.

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

Terms

The following terms are used in the description.

Unicast: Sending a frame to a single destination node identified by a unique individual MAC address.

Multicast: Sending a frame to a plurality of destination node simultaneously from a single source node where a unique group MAC address identifies the set of recipients.

Root: A root node (or "root") is the central node (also referred to as the topmost node) of a spanning tree or shortest path tree. In a shortest path tree, for unicast frame forwarding, the root is the destination node; for multicast frame forwarding, the root is the source node.

Service instance (or "Ethernet service instance"): An association of two or more attachment circuits (ACs) over which an Ethernet service is offered to a customer. An AC can be either a user-network interface (UNI) or a network-network interface (NNI). A service instance associated with a frame may be identified through an indication embedded within the frame.

Service instance identifier (SID): Identifying a service instance associated with a frame. A SID may be embedded within a protocol data unit (PDU) of the service instance or a frame encapsulating the PDU of the service instance.

Shortest path bridging—VLAN mode (SPBV): A type of SPB that is VLAN based, i.e., each shortest path tree being defined by a different VLAN Identifier (VID).

Shortest path bridging—MAC mode (SPBM): Another type of SPB in which the shortest path trees are MAC based, i.e., each shortest path tree being identified by a unique MAC address or an abbreviated form of MAC address. VLANs are used to delineate multipath variations.

Equal cost tree (ECT): Sometimes referred to as equal cost multi-tree (ECMT). When multiple equal-cost routes to a root exist, each shortest path tree is an ECT to the root. A node in a SPB network uses specified tie breaking algorithms in the construction of a specific ECT. An ECT set is identified by an ECT algorithm and VLAN is associated with a unique ECT-algorithm in one embodiment.

Network Configuration and Traditional MMRP Implementation

FIG. 1A is a block diagram illustrating one embodiment of a network configuration supporting multiple media access control (MAC) registration protocol (MMRP). Network 100 contains 11 nodes denoted by letters. The 11 nodes are interconnected forming a mesh topology. Each link between two nodes represents a direct connection between the two nodes. Note network 100 is a simplification of an operating Ethernet network. In the real world, an MMRP compatible Ethernet network may scale up to thousands of nodes and provide millions of unique services. Thus, network 100 is used only to illustrate embodiments of frame forwarding within an MMRP network.

Figure 1B:
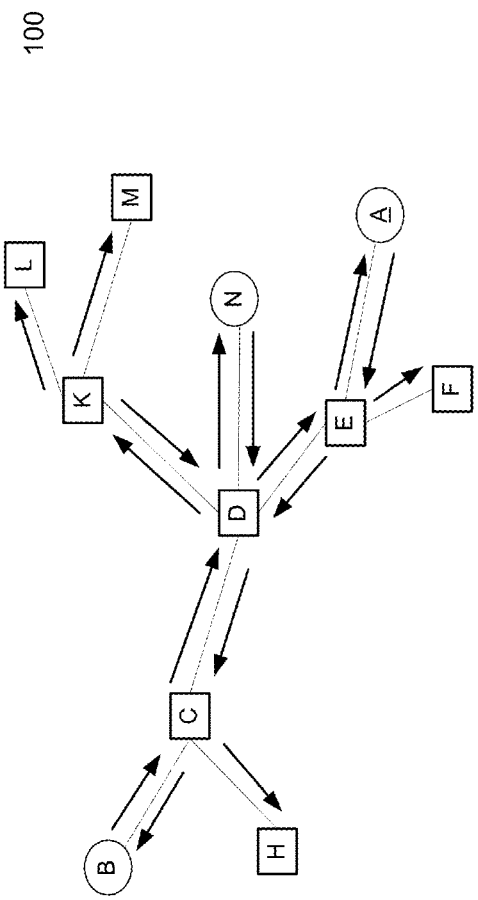
FIG. 1B is a block diagram illustrating MAC address registration according to one embodiment of MMRP.

FIG. 1B is a block diagram illustrating MAC address registration according to one embodiment of MMRP. A variety of frame forwarding protocols support MMRP, including spanning tree protocol (STP), rapid spanning tree protocol (RSTP), multiple spanning tree protocol (MSTP), and shortest path bridging (SPB) protocol. In this example, network 100 deploys an implementation of a spanning tree protocol. In network 100, for frame forwarding, redundant paths are disabled thus not shown in FIG. 1B. For example, the direct link between node A and F in FIG. 1A is no longer shown in FIG. 1B as the path is redundant—in FIGS. 1B, A and F can reach each other through connections A-E-F. The frame forwarding paths shown in FIG. 1B are bidirectional, thus the "go" and "return" paths between two nodes must be congruent, which is fundamental to traditional Ethernet flood-and-learn data path routing process.

Referring to FIG. 1B, for MAC address registration for a service instance, a node interested in the service instance issues an MMRP PDU, referred to as multiple MAC registration PDUs (MMRPDUs), following the spanning tree of network 100. Each node receiving the MMRPDUs installs an appropriate filtering for frame forwarding and continues to issue requests to other links (i.e., links other than the one transmitting the MMRPDU) in the spanning tree. In this way, when a node receives MMRP requests for a service instance, it installs filtering to permit frames associated with the service instance to flow in all directions registering interest of the service instance.

In this example, nodes A, B, and N are interested in a service instance and they are designated with circles around the node identifiers while the other nodes remain being designated with squares in FIG. 1B. The MMRPDUs are forwarded along the spanning tree. For nodes C, D, and E, the MMRPDUs are received on multiple ports, and these multiple ports are unblocked to allow frames associated with the service instance to be forwarded through.

MMRP registers interests in either multicast addresses or unicast addresses associated with service instances. Frame forwarding per service instance may be denoted as (*, G), which is pronounced star comma G. G is short for group, which is all nodes interested in a service instance (thus forming a group). The star represents all nodes interested in the service instance in the spanning tree. Frame forwarding through a spanning tree of (*, G) is in contrast with frame forwarding through a shortest path tree, denoted as (S, G) (where S is short for source). In a shortest path frame forwarding, the source is the root of the shortest path tree, and multicast/unicast frames interested in a particular service instance are forwarded from the source/root to the interested nodes.

In a traditional MMRP compatible network illustrated in FIG. 1, a node does not keep a record of which node is interested in a particular attribute. The node forwards on MMRPDUs it receives and use the information for installing filtering. It does not gather and pass along knowledge about how many nodes are interested in a particular attribute based on received MMRPDUs. For example, referring to FIG. 1B, node A receives an MMRPDU from node E, and node A knows that node E is interested in the particular attribute. It does not know that nodes further down the tree (nodes B and N in this example) are the actual nodes interested in the particular attribute. In other words, traditional MMRP only registers summarized interests in an attribute associated with a service instance along the spanning tree.

The summarization of registered interest by the traditional MMRP loses source information (thus contains only star comma G information for a given service instance). The "lossy" traditional MMRP presents a challenge in internetworking of an MMRP network and a non-MMRP network. For example, nodes in a spanning tree network (an MMRP network) and a SPBM network (a non-MMRP network) may be interested in a same attribute within the same service instance and the two networks are interconnected. For the SPBM network to work properly, it needs to know what backbone MAC addresses (B-MACs) and backbone virtual LAN identifier (B-VID) a service instance is associated with when a frame is forwarded from the spanning tree network. Yet, traditional MMRP does not contain the information.

Embodiments of Enhanced MMRP Implementation

Figure 2:
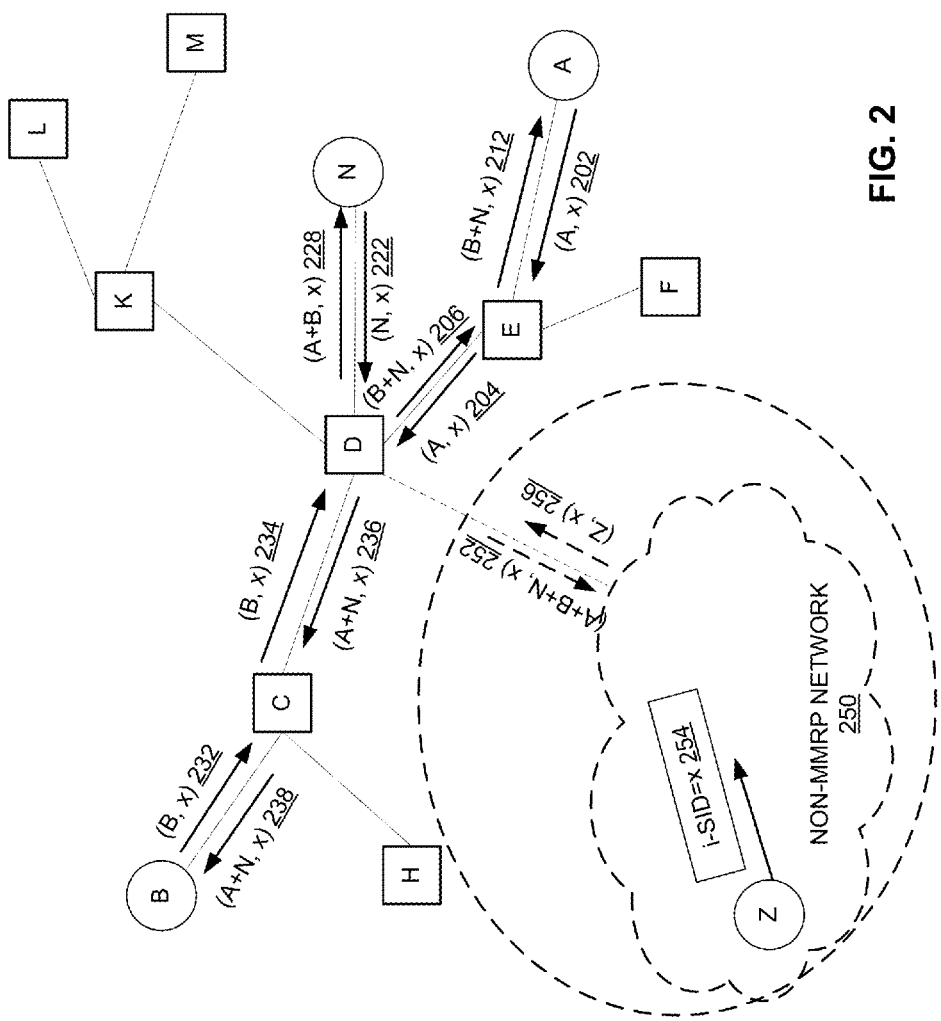
FIG. 2 is a block diagram illustrating an implementation of an enhanced MMRP implementation according to one embodiment of the invention.

FIG. 2 is a block diagram illustrating an implementation of an enhanced MMRP implementation according to one embodiment of the invention. Network 200 supports a logical loop-free topology as illustrated (physical links between nodes but not on the logical loop-free topology are not shown). The logical loop-free topology is created through a variety of protocols for frame forwarding, including STP, RSTP, MSTP, and SPB protocols. Note that some proprietary protocols have been implemented in various Ethernet networks and they support MMRP too. Those proprietary protocols may also be benefited from the principle around the enhanced MMRP disclosed herein.

Referring to FIG. 2, for MAC address registration for a service instance, a node interested in a MAC address associated with the service instance issues an MMRPDU following the spanning tree of network 200. Each node receiving the MMRPDU installs an appropriate filtering for frame forwarding on the node. In addition, each receiving node identifies the service instance associated with the received MMRPDU, and it forms a set of MAC addresses interested in the service instance from one or more MMRPDUs it receives. The formed set of MAC addresses is the superset of MAC addresses aggregated from one or more MMRPDUs associated with the particular service instance. Then the receiving node issues another set of MMRPDUs to other links (i.e., links other than the one receiving the MMRPDU) in the spanning tree, the other set of MMRPDU includes the superset of MAC addresses associated with the particular service instance in one embodiment. In an alternate embodiment, the other set of MMRPDUs includes the superset of MAC addresses associated with the particular service instance excluding the interested MAC addresses received from the other links—this embodiment reduces the size of MMRPDUs thus preferable in some circumstances. In both embodiments, an enhanced MMRP registers all MAC addresses interested in a particular service instance and it patches traditional MMRPDUs with source information.

Similar to network 100, network 200 contains 11 nodes and nodes A, B, and N are interested in addresses A, B, N within a service instance and they are designated with circles around the node identifiers while the other nodes remain being designated with squares. The MMRPDUs are forwarded along the spanning tree to all links associated with the service instance while keeping track of MAC addresses interested in the service instance. In FIG. 2, the service instance is denoted by "x" and an issued frame for service instance x is denoted by a tuple (S, x), where S denotes the source or sources interested in service instance x. For example, at node E, it receives an MMRPDU of (A, x) at reference 202 and an MMRPDU of (B+N, x) at reference 206. Node E then issues an MMRPDU of (B+N, x) to node A at reference 212 and it issues an MMRPDU of (A, x) to node D at reference 204. Node E does not send over the superset of all received MAC addresses (i.e., A+B+N in this example) to all interested nodes as the superset will make the resulting MMRPDU bigger and take more network transmission and process resources. The other MMRP receiving nodes issue new MMRPDUs similarly to node E and the issued MMRPDUs are illustrated in FIG. 2. After all MMRPDUs are processed, each node interested in service instance x knows the full set of MAC addresses interested in service instance x, and they may set frame forwarding filtering accordingly.

The operations in FIG. 2 so far focus on interactions among nodes within an MMRP network. For frame forwarding limits within an MMRP network, the gathering of source information of MMRPDUs may not offer extraordinary benefit. Yet the added information is essential for internetworking of the MMRP network with a non MMRP network. Referring to FIG. 2, network 200 may optionally interconnect with non-MMRP network 250 at node D (thus node D is a boundary node). The dotted lines denote that the interconnect is optional, and other nodes in network 200 may be an interconnecting node in a different embodiment.

Node Z of non-MMRP network 250 shares interest in service instance x as illustrated at reference 254. The interest of node Z to service instance x may not be expressed in a format understood by MMRP. In this example, the interest of node Z is indicated by a backbone service instance identifier (I-SID) being set to x. At boundary node D, an internetworking function converts the interest of node Z to a format/protocol understandable by the MMRP network, denoted by (Z, x) at reference 256. With the understood interest of node Z at non-MMRP network 250, node D formulates a superset of MAC addresses interested in group x excluding the transmitting link. The interested group is denoted by (A+B+N, x) at reference 252, and the internetworking function (often referred to as IWF) then may convert the interest in the MMRP network to a format/protocol understandable by non-MMRP network 250.

Thus, with an internetworking function at a boundary node, the enhanced MMRP allows information extraction about nodes interested in a particular service instance in an MMRP network supporting a logical loop-free topology. The boundary node then may save the extracted information from the MMRP in a control plane routing database of a non-MMRP network in a format/protocol understandable by the non-MMRP network, thus frame forwarding over two types of networks becomes operable.

Figure 3:
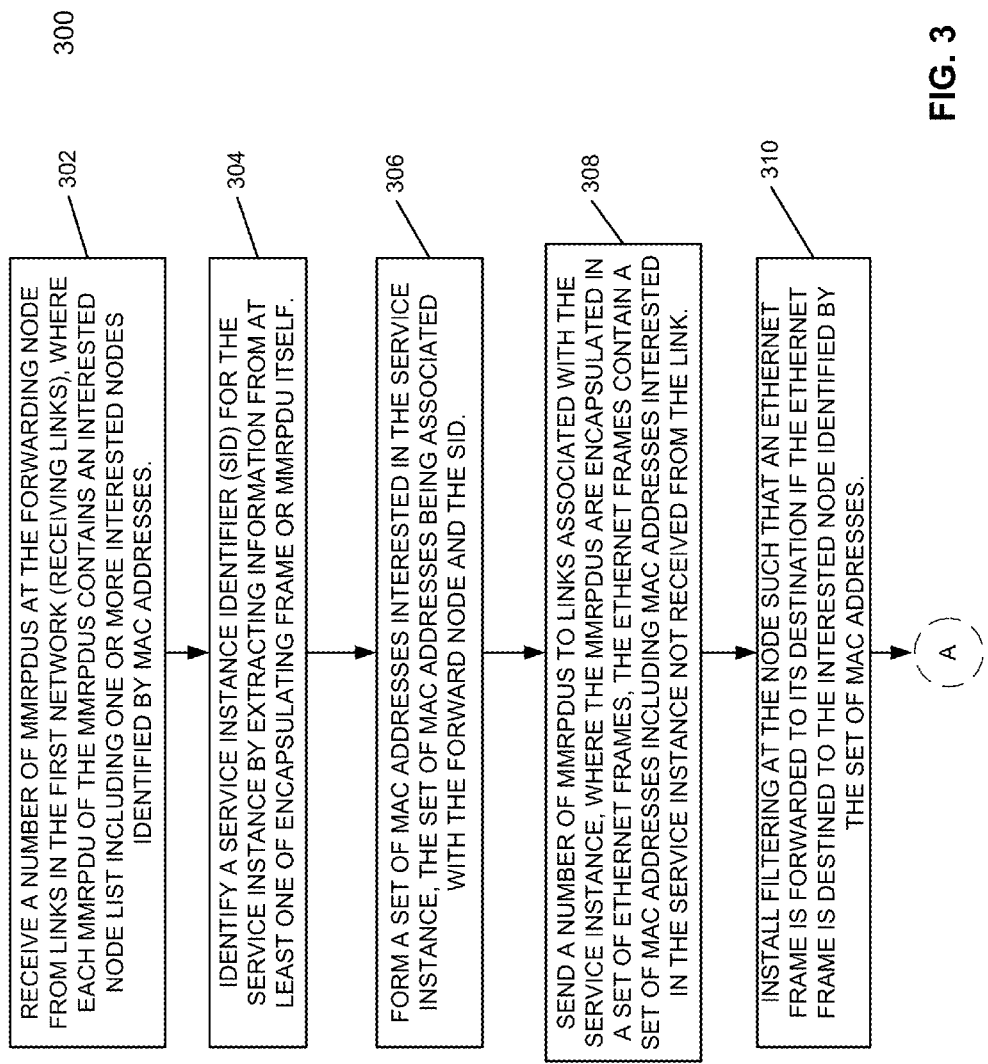
FIG. 3 is a flow diagram illustrating an implementation of enhanced MMRP according to one embodiment of the invention.

FIG. 3 is a flow diagram illustrating an implementation of enhanced MMRP according to one embodiment of the invention. Method 300 can be implemented at a node within a network complying with an implementation of MMRP. The network creates a logical loop-free topology, which may be based on spanning tree protocol (STP), rapid spanning tree protocol (RSTP), multiple spanning tree protocol (MSTP), and shortest path bridging (SPB) protocols. In some embodiments, the deployed STP, RSTP, or MSTP complies with IEEE 802.1ah standard. In addition, some Ethernet networks use proprietary protocols to create a logical loop-free topology and they support MMRP for MAC registrations. Those networks may also implement method 300.

Referring to FIG. 3, at reference 302, a node receives a number of MMRPDUs at the forwarding node from links in the network (referred to as receiving links). MMRPDU is an MMRP protocol data unit for registration of MAC address for a service instance. Often it is said that MMRPDU is for registering an interest in a multicast group, but the multicast group may contain either a group of MAC addresses (unicast or multicast) or a single MAC address (unicast or multicast). MMRPDU is issued to broadcast a node's interest to a service instance. Each received MMRPDU contains an interested node list including one or more interested nodes identified by MAC addresses.

Then at reference 304, the node identifies a service instance identifier (SID) for the service instance. The identification may be from the fields within the received MMRPDUs themselves, and it may also be from the Ethernet frames encapsulating the MMRPDUs (referred to as encapsulating frames). In some embodiments, the identification may be based on information from both the PDUs and the encapsulating Ethernet frames. From the MMRPDUs being identified to be associated with a same service instance, a set of MAC addresses interested in the service instance is formed at reference 306. The set of MAC addresses are associated with the SID and stored in the node. Note that the set of MAC addresses is a superset of received MAC addresses that are interested in the specific service instance. In other words, it keeps a record of all the source nodes issuing MMRPDUs for the specific service instance.

Onward to reference 308, the node sends a set of MMRPDUs to links associated with the service instance (transmitting links). The set of MMRPDUs containing a set of MAC addresses are encapsulated in a set of Ethernet frames containing references to the service instance. The set of MAC addresses includes MAC addresses interested in the service instance not received from the transmitting link. In some embodiments, the references to the service instance are embedded in the MMRPDUs. In alternate embodiments, the set of MAC addresses are stored in the encapsulating frames in a type length value (TLV) field when other protocols are used.

Figure 4:
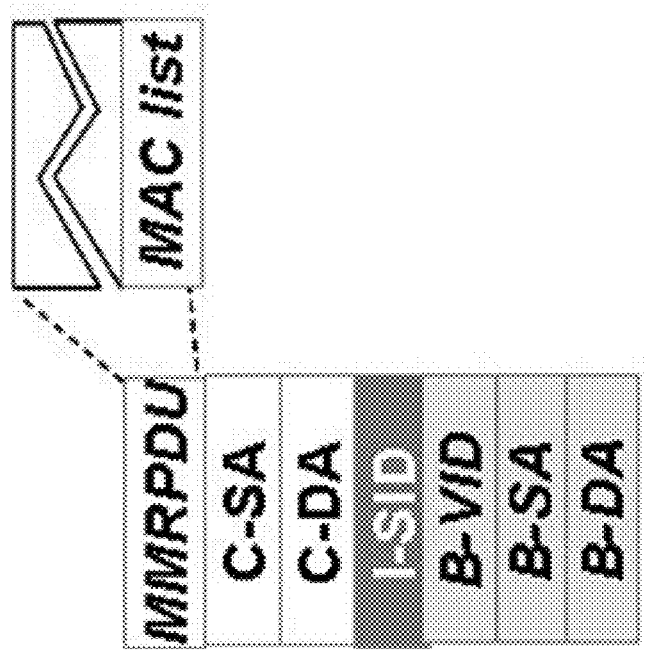
FIG. 4 is a block diagram illustrating a portion of an Ethernet frame encapsulating MMRPDU according to one embodiment of the invention.

FIG. 4 is a block diagram illustrating a portion of an Ethernet frame encapsulating MMRPDU according to one embodiment of the invention. For frame forwarding in a backbone network, the Ethernet frame contains fields for backbone source address (B-SA), backbone destination address (B-DA), and backbone VLAN identifier (B-VID). The Ethernet frame also contains backbone service identifier (I-SID) identifying a service instance the frame is interested in. Furthermore, the Ethernet frame contains fields for customer source address (C-SA) and customer destination address (C-DA). In the encapsulated MMRPDU, it contains the set of MAC addresses (denoted as MAC list in the figure). That is, the set of MAC addresses interested in the service instance is stored in a field of transmitted MMRPDU in this embodiment.

Figure 5:
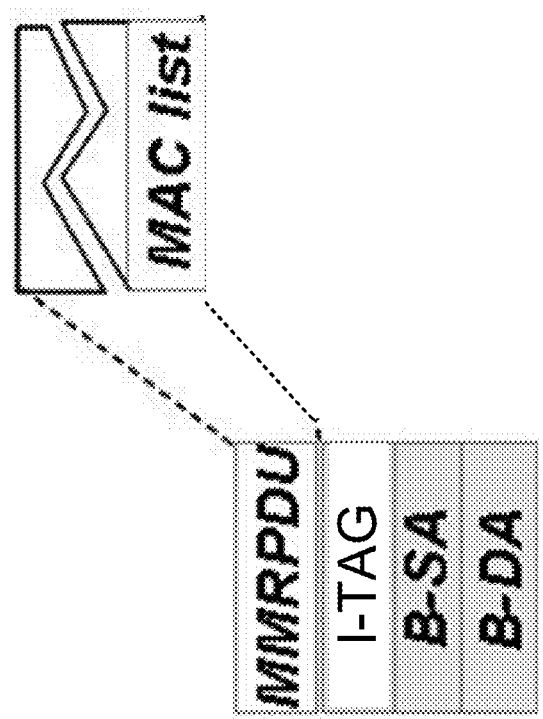
FIG. 5 is a block diagram illustrating a portion of an Ethernet frame encapsulating MMRPDU according to another embodiment of the invention.

FIG. 5 is a block diagram illustrating a portion of an Ethernet frame encapsulating MMRPDU according to another embodiment of the invention. Similar to FIG. 4, the Ethernet frame in FIG. 5 contains fields for B-SA, B-DA, but not a B-TAG. All the other fields are the same as in FIG. 4.

Referring back to FIG. 3, note that for reference 308, the set of MAC addresses do not include MAC addresses interested in the service instance when the MAC addresses are received from the transmitting link by the node. In this way, redundant information is not carried in the frame forwarding (as the transmitting link already knows the MAC addresses interested in the service instance it sends out MMRPDU for). It reduces the length of MMRPDU and/or the encapsulating frame. The scheme is akin to "reverse poisoning" of Ethernet frame forwarding where an Ethernet node does not forward a frame back to the port of arrival in frame forwarding to avoid forwarding loops. In an alternate embodiment though, the set of MAC addresses may include all MAC addresses interested in the service instance, regardless of where the interested MAC addresses are received. Even though it takes more transmission and frame processing sources, the alternate embodiment simplifies implementation.

Onward to reference 310, the node installs filtering such that an Ethernet frame is forwarded at the receiving node to its destination if the Ethernet frame is destined to one or more interested nodes identified by the stored set of MAC addresses.

Note that the transmitted MMRPDUs in method 300 may be fragmented into multiple MMRPDUs to comply with a size limit of maximum transmission unit (MTU) of MMRP as defined.

Enhanced MMRP Implementations at Boundary Nodes

As discussed herein above, embodiments of the inventions registers all MAC addresses interested in a particular service instance and it patches traditional MMRPDUs with source information. Yet for frame forwarding limits within as MMRP network, the extra source information of MMRPDUs may not offer extraordinary benefit. The benefit of the extra source information of MMRPDUs is that the information may be used for frame forwarding between an MMRP network and a non-MMRP network.

Figure 6:
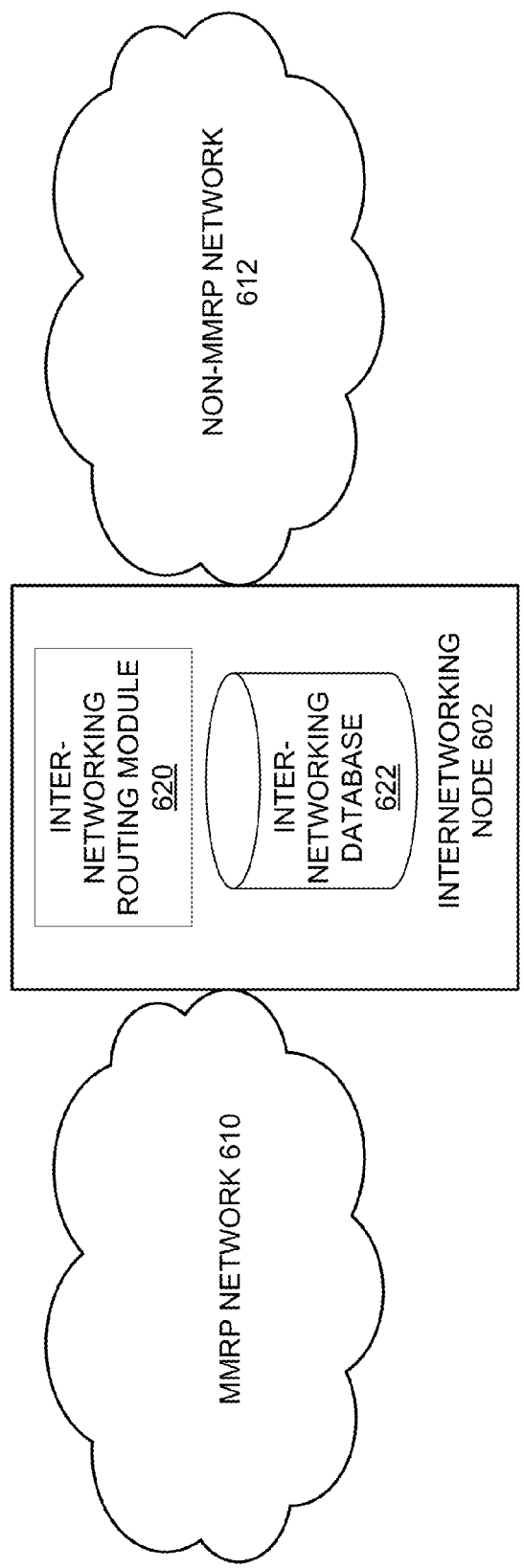
FIG. 6 is a block diagram illustrating a network interconnection according to an embodiment of the invention.

FIG. 6 is a block diagram illustrating a network interconnection according to an embodiment of the invention. FIG. 6 illustrates internetworking node 602 interconnects an MMRP network 610 and a non-MMRP network 612. As discussed herein above, an MMRP network is a network utilizing MMRP for registering MAC addresses for a service instance while a non-MMRP does not register MAC addresses for a service instance utilizing MMRP. MMRP network 610 may be a network supporting STP, RSTP, MSTP, or one implementation of SPB protocols (e.g., SPBV). Non-MMRP network 612 may be a network support Ethernet virtual private network (EVPN) protocol, virtual private LAN service (VPLS) protocol, or another implementation of SPB protocol (e.g., SPBM).

Internetworking node 602 is at the boundary between MMRP network 610 and non-MMRP network 612. It contains both MMRP interaction portion and non-MMRP interaction portion. The MMRP interaction portion of receiving and transmitting MMRPDUs and encapsulating frames has been discussed herein above. For non-MMRP interaction portion, it contains an internetworking routing module 620 and internetworking database 622. Internetworking routing module 620 selects itself to represent specific I-SIDs by a criterion (e.g., associated with a B-VID) in one network into two interconnecting networks through a designated forwarder (DF) selection process. Thus through inferring from I-SID at the IWF, internetworking routing module 620 decouples B-VID assignments across networks. Note the internetworking function has been disclosed in a non-provisional U.S. patent application Ser. No. 13/594,076, entitled "802.1aq Support over IETF EVPN" by David Ian Allan, filed on Aug. 24, 2012 (its corresponding provisional U.S. patent application is 61/645,431 with the same title and authorship, filed on May 10, 2012).

At internetwork node 602, an MMRPDU and/or its encapsulating frame are processed, if an extracted service instance from the process is associated with a B-VID that a DF within internetworking routing module 620 is proxy for, internetworking routing module 620 extracts the service instance identifier (e.g., an I-SID) and MAC addresses interested in the service instance identifier and stored in internetworking database 622. Internetworking database 622 may be a frame forwarding database on the control plane, and it may be used for frame forwarding using an implementation of intermediate system-intermediate system (IS-IS) protocol.

Figure 7:
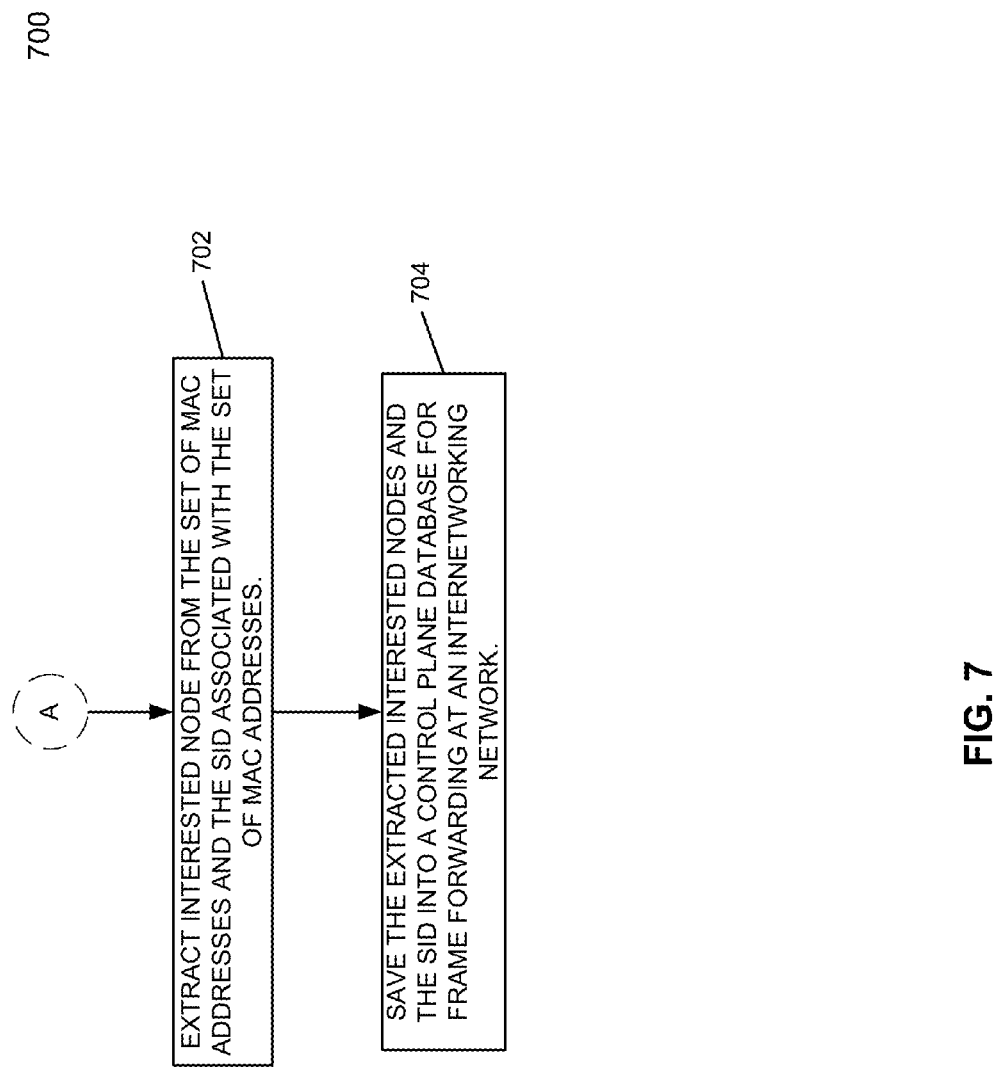
FIG. 7 is a flow diagram illustrating a method of utilizing information extracted from a boundary node at a network implementing an enhanced MMRP according to one embodiment of the invention.

FIG. 7 is a flow diagram illustrating a method of utilizing information extracted from a boundary node at a network implementing an enhanced MMRP according to one embodiment of the invention. Method 700 is a continuation of method 300, where a set of MAC addresses interested in a service instance is formed and stored, the set of MAC addresses are associated with a service instance identifier identifying the service instance. Method 700 is implemented in a boundary node that interacts with both an MMRP network and a non MMRP network—for example, the bound node may have Ethernet ports facing both an MMRP network and a non MMRP network.

At reference 702, the boundary node extracts information about interested nodes from the stored set of MAC addresses and the SID associated with the stored set of MAC addresses. Then at reference 704, the information about interested nodes and the SID associated with the interested nodes are saved in a control plane database for frame forwarding at an interconnecting network, where the interconnecting network does not use MMRP to register interest to service instances. The saved information may be used for frame forwarding using an IS-IS protocol. Note the either network at the boundary node may support an implementation of SPB protocols, and the implementation of SPB protocols may comply with IEEE 802.1aq standard.

Internetworking Utilizing Embodiments of Enhanced MMRP Implementation

The enhanced MMRP embodiment disclosed herein may be used in a variety of internetworking scenario as the extracted registration information for a service instance allows a non-MMRP network translates, maps, or converts to formats/protocols that the non-MMRP network may use for frame forwarding for frames associated with the service instance across its network. The examples herein provide an illustration but by no means exhaustive list of applicable internetworking scenarios.

Figure 8A:
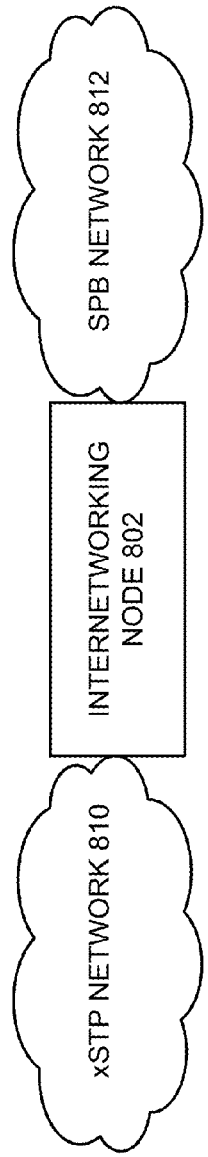
FIGS. 8A-C are block diagrams illustrating network interconnections with different frame forwarding schemes according to embodiments of the invention.
Figure 8B:
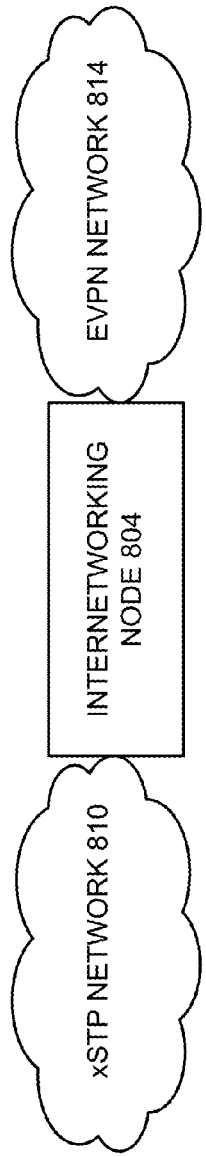
Figure 8C:
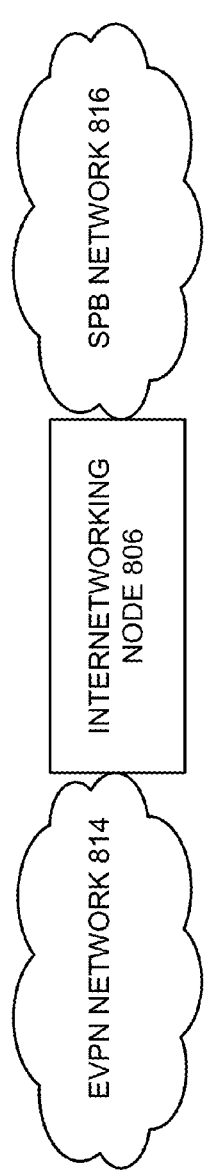

FIGS. 8A-C are block diagrams illustrating network interconnections with different frame forwarding schemes according to embodiments of the invention. In FIG. 8A, xSTP network 810 interconnects with SPB network 812 through internetworking node 802. xSTP network 810 can be a network supporting STP, RSTP, or MSTP. In xSTP network 810, MMRP is utilized to register interests in a service instance. xSTP network 810 may comply with IEEE 802.1ah standard. SPB network 812 forwards Ethernet frames along shortest path trees and each node within SPB network 812 may contain filtering database (FDB) to guide Ethernet frame forwarding. In other word, each node within SPB network 812 contains a local view of the link state of the network, and it does not need a "flood-and-learn" mechanism for frame forwarding as xSTP network 810 would.

For internetworking between xSTP network 810 and SPB network 812, internetworking node 802 receives an I-TAGed MMRPDU from a port facing xSTP network 810, and extracts the I-SID (identifying a service instance) and associated MAC addresses to save in a control plane database for frame forwarding using an IS-IS protocol for SPB network 812. Node 802 may create SPBM service identifier and unicast sub address TLVs in order to leak the extracted MMRP information into the control plane database for frame forwarding using IS-IS.

At the opposite path, node 802 also originates MMRPDU and encapsulating frames into xSTP network 810 for nodes within SPB network 812, where the nodes are interested in a service instance across xSTP network 810.

In FIG. 8B, xSTP network 810 interconnects with EVPN network 814. EVPN network 814 may pass through MMRP information extracted from xSTP network 810. For example, in EVPN network 814, an implementation of border gateway protocol (BGP) may be deployed to pass through the extracted service instances and their associated set of MAC addresses, and the information may be utilized to another network requiring the information for frame forwarding (e.g., a SPBM network), which is illustrated in FIG. 8C. The extracted MAC address information has been passed through EVPN network 814. At internetworking node 806, the information is extracted and leaked onto control plane of SPB network 816 for an IS-IS based frame forwarding.

Interconnections illustrated in FIG. 8 are for frame forwarding across networks deploying different protocols. These xSTP, SPB, and EVPN networks may follow standard based implementation but they may also use proprietary protocols to simplify protocol implementation or gain competitive advantage. Nevertheless, even for proprietary protocols, the embodiments and principles disclosed for enhancing MMRP apply.

FIGS. 9A-B are block diagrams illustrating internetworking functions with some standard protocol suites according to embodiments of the invention. Conceptually, internetworking function 900 is implemented for translating, mapping, or converting frames received from one protocol suite to another. In FIG. 9A, internetworking function 900 receives a frame complying with IEEE 802.1aq protocol suite 912, where in this example the frame indicates interest to a service instance associated with a network complying with IEEE 802.1ah protocol suite 914. Internetworking function 900 may originate a MMRPDU and send the MMRPDU to the network complying with IEEE 802.1ah protocol suite 914 to announce the interest. The Ethernet frame for the service instance from IEEE 802.1aq protocol suite 912 will be passed to the network.

In the reverse direction, Internetworking function 900 receives an MMRPDU and its encapsulating frame complying with IEEE 802.1ah protocol suite 912, it extracts the service instance identifier (SID) and the set of MAC addresses associated with the SID. An Ethernet frame goes from the network complying with IEEE 802.1ah protocol suite 914 to the network complying with IEEE 802.1aq protocol suite 912 may have the OUI overwritten with a source ID of the node implementing internetworking function 900.

FIG. 9B illustrates that the internetworking function between different protocol suites may go through networks with pass through only. In FIG. 9B, a IEEE 802.1aq protocol suite 952 interacts with internetworking function 954, which extract information required to route across networks not supporting IEEE 802.1aq. The extracted information may pass through one or more networks, where the one or more networks may perform only a pass through function without processing the extracted information from IEEE 802.1aq protocol suite 952. Similarly, in the reverse direction, internetworking function 956 interacts with a networking complying with IEEE 802.1ah protocol suite 958. The extracted information may be passed through one or more networks where only pass through function 950 is performed.

Embodiments of Network Devices Implementing Enhanced MMRP

Figure 10:
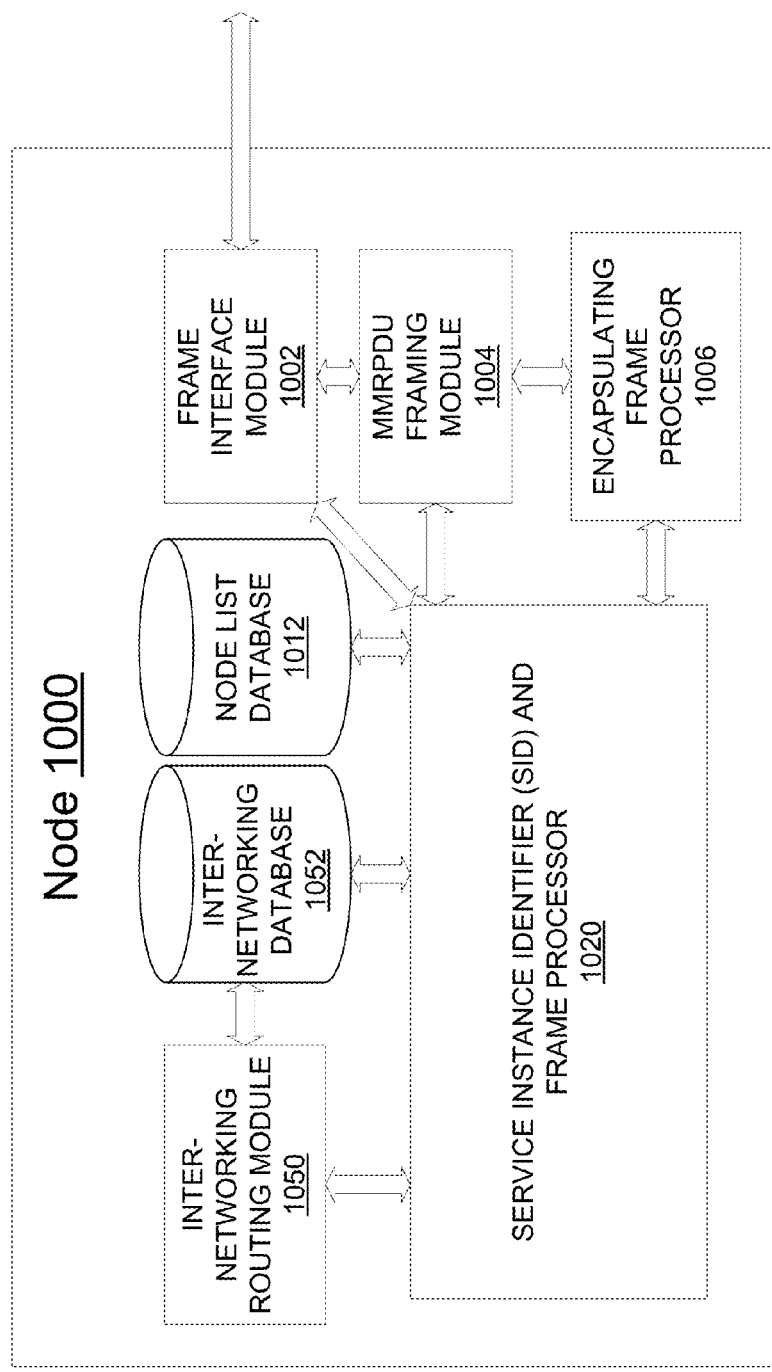
FIG. 10 is a block diagram illustrating a network device serving as a node implementing enhanced MMRP according to one embodiment of the invention.

FIG. 10 is a block diagram illustrating a network device serving as a node implementing enhanced MMRP according to one embodiment of the invention. In one embodiment, the network device includes a set of one or more line cards/processor (e.g., frame interface module 1002, MMRPDU framing module 1004), a set of one or more control cards (e.g., SID and frame processor 1020), and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network device through the line cards. Note that embodiments of this invention apply where the control plane and data plane are in separate network devices. Not only modules/processors relates to the embodiment are shown for illustration and other modules/processors are required for the node to function properly.

Node 1000 may contain frame interface module 1002 configured to receive MMRPDUs from links in the network (receiving links). Each received MMRPDU may contain an interested node list including one or more interested nodes identified by MAC addresses. Node 1000 also contains a SID processor configured to identify a SID for a service instance. The identification may be performed by extracting information from a received MMRPDU and/or an Ethernet frame encapsulating the received MMRPDU. The extracted information includes both SIDs and a list of MAC addresses interested in the SID. A node list database 1012 within node 1000 is configured to store the extracted list of MAC addresses. Encapsulating frame processor 1006 may also be included within node 1000, it may be utilized to assemble and dissemble encapsulating frames for received MMRPDU. In some embodiments, SID information may be embedded within the encapsulating frame but not in the MMRPDU and encapsulating frame processor 1006 may be configured to perform the function of extracting SID information in these embodiments. Note that various modules can be implemented as a single unit or multiple units can combine two or more units within Node 1000, and these modules can be implemented in software, hardware or a combination thereof.

Node 1000 sends out MMRPDUs and encapsulating Ethernet frames, and MMRPDU framing module 1004 is configured to generate MMRPDUs and encapsulating Ethernet frames. The generated MMRPDUs and encapsulating Ethernet frames are sent through the frame interface module 1002 to links associated with a service instance. The generated MMRPDU contains a set of MAC address which includes MAC addresses interested in a service instance not received from the links. In some embodiments, the generated MMRPDU contains all MAC addresses interested in the service instance. Note frame interface module is configured to install filtering at the node such that an Ethernet frame is forwarded to its destination if the Ethernet frame is destined to one or more interested nodes identified by the first set of MAC addresses. Node 1000 may be implemented in a network supporting STP, RSTP, MSTP, and SPB protocols. The spanning tree protocols (STP, RSTP, and MSTP) may comply with IEEE 802.1ah.

In one embodiment, node 1000 receives MMRPDUs and their encapsulating frames at frame interface module 1002. The received MMRPDUs and their encapsulating frames are forwarded to SID and frame processor 1020 to identify SIDs associated with service instances, along with sets of MAC addresses being associated with the SIDs. The information may be extracted from the encapsulating frames or the MMRPDUs themselves. The identified SIDs and their associated sets of MAC addresses are stored in node list database 1012. Then MMRPDU framing module 1004 generates a set of MMRPDUs and encapsulating frames. The encapsulating frames and MMRPDUs are sent through frame interface module 1002 to links associated with the service instance. Furthermore, the frame interface module 1002 installs filtering at the node such that an Ethernet frame is forwarded to its destination if the Ethernet frame is destined to one or more interested nodes identified by the stored set of MAC addresses.

Node 1000 may be deployed at a boundary of a network supporting MMRP and a second network not supporting MMRP. For node 1000 at the boundary, it may contain an internetworking routing module 1050 and internetworking database 1052. Internetworking routing module 1050 is configured to extract information about the interested nodes from the stored set of MAC addresses and the SID associated with the stored set of MAC addresses. Internetworking database 1052 is configured to save the extracted information about the interested nodes and the SID for frame forwarding at the second network based on a protocol compatibility determination at the second network. The second network may comply with IEEE 802.1aq standard. In one embodiment, the second network supports one of EVPN and VPLS protocol.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to forward Ethernet frames associated with a service instance at a node (a "forwarding node") in a first network supporting an implementation of a protocol for creating logical loop-free topologies, wherein the service instance identifies a service through the first network, wherein Ethernet frames are forwarded in links associated with the service instance within the first network, wherein media access control (MAC) address registration with the first network complies with an implementation of multiple MAC registration protocol (MMRP), wherein nodes of the first network with MAC address interests issue MMRP protocol data units (PDUs), multiple MAC registration PDUs (MMRPDUs), that follow the service instance within the first network, the method comprising:
- receiving a first plurality of MMRPDUs at the forwarding node from links in the first network (receiving links), wherein each MMRPDU of the first plurality of MMRPDUs contains a first interested node list including one or more interested nodes identified by MAC addresses;
- identifying a service instance identifier (SID) for the service instance by extracting information from at least one of:
  - each frame encapsulating an MMRPDU (encapsulating frame) and
  - each MMRPDU itself;
- forming a first set of MAC addresses interested in the service instance, the first set of MAC addresses being associated with the forward node and the SID;
- sending a second plurality of MMRPDUs to links associated with the service instance (transmitting links), wherein the second plurality of MMRPDUs are encapsulated in a set of Ethernet frames identifying the service instance, wherein the set of encapsulated MMRPDUs contains a second set of MAC addresses, the second set of MAC addresses includes MAC addresses interested in the service instance not received from the transmitting link; and
- installing filtering at the forwarding node such that an Ethernet frame is forwarded at the receiving node to its destination if the Ethernet frame is destined to one or more interested nodes identified by the first set of MAC addresses.

2. The method of claim 1, wherein the implementation of a protocol for creating logical loop free topologies is one of spanning tree protocol (STP), rapid spanning tree protocol (RSTP), multiple spanning tree protocol (MSTP), and shortest path bridging (SPB) protocol.

3. The method of claim 2, wherein the implementation of the one of the spanning tree protocol (STP), rapid spanning tree protocol (RSTP), multiple spanning tree protocol (MSTP) and shortest path bridging (SPB) complies with IEEE 802.1ah.

4. The method of claim 1, wherein the second set of MAC address further includes MAC addresses interested in the service instance received from the transmitting link.

5. The method of claim 1, wherein the first set of MAC addresses associated with the forwarding node is contained in a type length value (TLV) field to be attached to a different signaling protocol if the different signaling protocol is used.

6. The method of claim 1, wherein a destination address of the Ethernet frame is an individual MAC address.

7. The method of claim 1, wherein a destination address of the Ethernet frame is a group MAC address.

8. The method of claim 1, wherein the service instance associated with the forwarding node is associated with a backbone service instance identifier (I-SID) identifying the service instance and the encapsulating frame is associated with a backbone service instance tag (I-TAG).

9. The method of claim 8, wherein the forwarding node is at a boundary between the first network and a second network, wherein a port of the forwarding node faces the second network, the method further comprising:
- extracting information about the interested nodes from the first set of MAC addresses and the SID associated with the first set of MAC addresses; and
- saving the extracted information about the interested nodes and the SID into a control plane database for frame forwarding at the second network based on a protocol compatibility determination at the second network.

10. The method of claim 9, wherein the first network or the second network support an implementation of shortest path bridging (SPB) protocol, and wherein the database is for frame forwarding using an implementation of intermediate system-intermediate system (IS-IS) protocol.

11. The method of claim 10, wherein the implementation of SPB protocol complies with IEEE 802.1aq standard.

12. The method of claim 9, wherein the second network supports an implementation of Ethernet virtual private network (EVPN) protocol.

13. The method of claim 9, wherein the second network supports an implementation of virtual private LAN service (VPLS) protocol.

14. The method of claim 1, wherein the MMRPDUs are fragmented to comply with a size limit of maximum transmission unit (MTU) of MMRP.

15. A network device serving as a node in a first network supporting an implementation of a protocol for creating logical loop-free topologies, the network device configured to forward Ethernet frames associated with a service instance, wherein the service instance identifies a service through the first network, wherein Ethernet frames are forwarded in links associated with the service instance within the first network, wherein media access control (MAC) address registration with the first network complies with an implementation of multiple MAC registration protocol (MMRP), wherein nodes of the first network with MAC address interests issue MMRP protocol data units (PDUs), multiple MAC registration PDUs (MMRPDUs), that follow the service instance within the first network, the network device comprising:
- a frame interface module configured to receive a first plurality of MMRPDUs from links in the first network (receiving links), wherein each MMRPDU of the first plurality of MMRPDUs contains a first interested node list including one or more interested nodes identified by MAC addresses;
- a service instance identifier (SID) and frame processor configured to identify a SID for the service instance by extracting information from at least one of:
  - each frame encapsulating an MMRPDU (encapsulating frame) and
  - each MMRPDU itself;
- a node list database configured to store a first set of MAC addresses interested in the service instance, the first set of MAC addresses being associated with the node and the SID; and
- a MMRPDU framing module configured to generate a second plurality of MMRPDU, wherein the second plurality of MMRPDUs are encapsulated in a set of Ethernet frames identifying the service instance, wherein the set of Ethernet frames are sent through the frame interface module to links associated with the service instance (transmitting links), wherein the set of encapsulated MMRPDUs contains a second set of MAC addresses, the second set of MAC addresses includes MAC addresses interested in the service instance not received from the transmitting link, wherein the frame interface module is further configured to install filtering at the node such that an Ethernet frame is forwarded to its destination if the Ethernet frame is destined to one or more interested nodes identified by the first set of MAC addresses.

16. The network device of claim 15, wherein the implementation of a protocol for creating logical loop free topologies is one of spanning tree protocol (STP), rapid spanning tree protocol (RSTP), multiple spanning tree protocol (MSTP), and shortest path bridging (SPB) protocol.

17. The network device of claim 16, wherein the implementation of the one of the spanning tree protocol (STP), rapid spanning tree protocol (RSTP), multiple spanning tree protocol (MSTP) and shortest path bridging (SPB) complies with IEEE 802.1ah.

18. The network device of claim 15, wherein the second set of MAC address further includes MAC addresses interested in the service instance received from the transmitting link.

19. The network device of claim 15, wherein the first set of MAC addresses associated with the forwarding node is contained in a type length value (TLV) field to be attached to a different signaling protocol if MMRP is not used.

20. The network device of claim 15, wherein a destination address of the Ethernet frame is an individual MAC address.

21. The network device of claim 15, wherein a destination address of the Ethernet frame is a group MAC address.

22. The network device of claim 15, wherein the service instance associated with the forwarding node is associated with a backbone service instance identifier (I-SID) identifying the service instance and the encapsulating frame is associated with a backbone service instance tag (I-TAG).

23. The network device of claim 15, wherein the network device is at a boundary between the first network and a second network, wherein a port of the forwarding node faces the second network, the network device further comprising:
internetworking module configured to extract information about the interested nodes from the first set of MAC addresses and the SID associated with the first set of MAC addresses; and
internetworking database configured to save the extracted information about the interested nodes and the SID for frame forwarding at the second network based on a protocol compatibility determination at the second network.

24. The network device of claim 15, wherein the first network or the second network support an implementation of shortest path bridging (SPB) protocol, and wherein the database is for frame forwarding using an implementation of intermediate system-intermediate system (IS-IS) protocol.

25. The network device of claim 24, wherein the implementation of SPB protocol complies with IEEE 802.1aq standard.

26. The network device of claim 23, wherein the second network supports an implementation of Ethernet virtual private network (EVPN) protocol.

27. The network device of claim 23, wherein the second network supports an implementation of virtual private LAN service (VPLS) protocol.

28. The network device of claim 15, wherein the MMRP-DUs are fragmented to comply with a size limit of maximum transmission unit (MTU) of MMRP.

29. A method to forward Ethernet frames associated with a service instance at a node (a "forwarding node") in a first network supporting an implementation of a protocol for creating logical loop-free topologies, wherein the forwarding node is at a boundary between the first network and a second network, wherein a port of the forwarding node faces the second network, wherein the service instance identifies a service through the first network, wherein Ethernet frames are forwarded in links associated with the service instance within the first network, wherein media access control (MAC) address registration with the first network complies with an implementation of multiple MAC registration protocol (MMRP), wherein nodes of the first network with MAC address interests issue MMRP protocol data units (PDUs), multiple MAC registration PDUs (MMRPDUs), that follow the service instance within the first network, the method comprising:
receiving a first plurality of MMRPDUs at the forwarding node from links in the first network (receiving links), wherein each MMRPDU of the first plurality of MMRPDUs contains a first interested node list including one or more interested nodes identified by MAC addresses;
identifying a service instance identifier (SID) for the service instance by extracting information from at least one of:
each frame encapsulating an MMRPDU (encapsulating frame) and
each MMRPDU itself;
forming a first set of MAC addresses interested in the service instance, the first set of MAC addresses being associated with the forward node and the SID;
sending a second plurality of MMRPDUs to links associated with the service instance (transmitting links), wherein each MMRPDU of the second plurality of MMRPDUs to a transmitting link contains a second set of MAC addresses, the second set of MAC addresses includes MAC addresses interested in the service instance not received from the transmitting link;
installing filtering at the forwarding node such that an Ethernet frame is forwarded at the receiving node to its destination if the Ethernet frame is destined to one or more interested nodes identified by the first set of MAC addresses;
extracting the interested nodes from the first set of MAC addresses and the SID associated with the first set of MAC addresses; and
saving the extracted interested nodes and the SID into a control plane database for frame forwarding at the second network based on a protocol compatibility determination at the second network.

30. A network device serving as a node in a first network supporting an implementation of a protocol for creating logical loop-free topologies, the network device configured to forward Ethernet frames associated with a service instance, wherein the network device is at a boundary between the first network and a second network, wherein a port of the forwarding node faces the second network, wherein the service instance identifies a service through the first network, wherein Ethernet frames are forwarded in links associated with the service instance within the first network, wherein media access control (MAC) address registration with the first network complies with an implementation of multiple MAC registration protocol (MMRP), wherein nodes of the first network with MAC address interests issue MMRP protocol data units (PDUs), multiple MAC registration PDUs (MMRPDUs), that follow the service instance within the first network, the network device comprising:
a frame interface module configured to receive a first plurality of MMRPDUs from links in the first network (receiving links), wherein each MMRPDU of the first plurality of MMRPDUs contains a first interested node list including one or more interested nodes identified by MAC addresses;
a service instance identifier (SID) and frame processor configured to identify a SID for the service instance by extracting information from at least one of:
each frame encapsulating an MMRPDU (encapsulating frame) and
each MMRPDU itself;

a node list database configured to store a first set of MAC addresses interested in the service instance, the first set of MAC addresses being associated with the node and the SID; and a MMRPDU framing module configured to generate a second plurality of MMRPDU, the second plurality of MMRPDU being sent through the frame interface module to links associated with the service instance (transmitting links), wherein the second plurality of MMRPDUs are encapsulated in a set of Ethernet frames identifying the service instance, wherein the set of encapsulated MMRPDUs contains a second set of MAC addresses, the second set of MAC addresses includes MAC addresses interested in the service instance not received from the transmitting link;

internetworking module configured to extract the interested nodes from the first set of MAC addresses and the SID associated with the first set of MAC addresses; and internetworking database configured to save the extracted interested nodes and the SID for frame forwarding at the second network based on a protocol compatibility determination at the second network, wherein the frame interface module is further configured to install filtering at the forwarding node such that an Ethernet frame is forwarded at the receiving node to its destination if the Ethernet frame is destined to one or more interested nodes identified by the first set of MAC addresses.

* * * * *

UNITED STATES PATENT AND TRADEMARK OFFICE
CERTIFICATE OF CORRECTION

| | | |
|---|---|---|
| PATENT NO. | : 8,958,344 B2 | Page 1 of 1 |
| APPLICATION NO. | : 13/772240 | |
| DATED | : February 17, 2015 | |
| INVENTOR(S) | : Farkas et al. | |

It is certified that error appears in the above-identified patent and that said Letters Patent is hereby corrected as shown below:

Specification

In Column 1, Line 38, delete "Internnection" and insert -- Interconnection --, therefor.

In Column 5, Line 17, delete "(RSVP))" and insert -- (RSVP) --, therefor.

In Column 6, Line 42, delete "FIGS." and insert -- FIG. --, therefor.

Signed and Sealed this
Twentieth Day of October, 2015

Michelle K. Lee
*Director of the United States Patent and Trademark Office*